United States Patent [19]

Posey, Jr.

[11] Patent Number: 4,741,844

[45] Date of Patent: May 3, 1988

[54] LIQUID COMPOSITION AND METHOD OF USE FOR PRODUCING A FOAMED STIMULATION FLUID FOR OIL AND GAS WELLS

[75] Inventor: Ken Posey, Jr., Houston, Tex.

[73] Assignee: Amoco Corporation, Chicago, Ill.

[21] Appl. No.: 892,973

[22] Filed: Aug. 4, 1986

[51] Int. Cl.$^4$ ............................................. E21B 43/27
[52] U.S. Cl. ................................. 252/8.553; 166/307
[58] Field of Search ............... 252/8.553, 8.552, 8.551

[56] References Cited

U.S. PATENT DOCUMENTS

| | | | |
|---|---|---|---|
| 3,819,520 | 6/1974 | Jones et al. | 252/8.553 |
| 3,980,136 | 9/1976 | Plummer et al. | 252/8.551 X |
| 4,044,833 | 8/1977 | Volz | 166/307 |
| 4,217,231 | 8/1980 | King | 252/8.551 |
| 4,601,836 | 7/1986 | Jones | 166/307 |

Primary Examiner—Herbert B. Guynn

[57] ABSTRACT

A method for use of a liquid composition and a liquid composition comprising between about 60 to about 95 volume percent of a water-soluble acid for use in treating subterranean strata, and a base fluid comprising between about 90 to about 60 volume percent of a mixture of at least one eight-carbon aliphatic alcohol and at least one aliphatic alcohol with between one and five carbon atoms and between about 10 to about 40 volume percent of a foaming agent, which when a suitable gas is added will produce a foam suitable for use in stimulating oil and gas wells. Optionally, the base fluid can contain a surfactant comprising a phenoxy polyoxy ethylene alcohol containing 10 to 18 oxyethylene units.

5 Claims, No Drawings

LIQUID COMPOSITION AND METHOD OF USE FOR PRODUCING A FOAMED STIMULATION FLUID FOR OIL AND GAS WELLS

BACKGROUND OF THE INVENTION

This invention relates to foamed fluids to be introduced into wellbores drilled into the earth for the production of hydrocarbons, to clean and stimulate the subterranean strata adjacent the wellbore. More specifically, it is concerned with a liquid composition and method of use of this liquid composition for producing foamed stimulation fluids for use in connection with wellbore cleanout, acidizing and hydraulic fracturing for purposes of workover or stimulation of injection or production wells.

In the drilling and subsequent maintenance of injection and production wellbores for the production of hydrocarbons from subterranean strata, it is often necessary to remove plugging materials from the face of the wellbore and from the subterranean strata near the wellbore. As is commonly known in the art, one method of accomplishing the removal of these plugging materials is to wash the wellbore and near-wellbore area in the subterranean strata with an acid to dissolve and/or loosen these plugging materials and improve near-wellbore subterranean strata permeability.

It is known that this "acidizing" of a wellbore can be made more effective by using a mixture of from about 70 to about 24 volume percent of a mixture of an octyl alcohol and a lower aliphatic alcohol selected from the group consisting of ethanol, the propyl alcohols and tertiary butyl alcohol and from about 30 to about 76 volume percent of an aqueous solution of a well acidizing, nonoxidizing, water-soluble acid (see U.S. Pat. No. 3,819,520). It has been shown that the alcohol mixture serves to reduce the interfacial tension between the acid and oil underground, thereby improving the displacement of oil by the acid.

It is known that when fluids are introduced into a wellbore, fluid loss to the subterranean strata surrounding the wellbore can be a significant problem. It is also known that foams have a number of advantages when employed in oilfield applications, including generally lower fluid loss. U.S. Pat. No. 4,217,231, recognizes the advantages of foams and teaches the use of small amounts (between 0.0005 to 0.05 weight percent) of an additive comprising certain alcohols and organic acids (those with between 5 and 10 carbon atoms) malonic acid and lower n-alkyl diesters of malonic acid in aqueous foams to further reduce fluid loss. This patent further recites that those alcohols with less than five carbon atoms act as foam breakers and that those alcohols with from 5 to 10 carbon atoms were widely believed to be defoamers but that in low concentrations (i.e., between about 0.005 to 0.05 volume percent) and especially at elevated pressures (greater than 500 psi, these additives are compatible with foam.

Thus, it is known that the acidizing of wellbores to remove and/or loosen plugging materials from the wellbore and the subterranean strata near the wellbore can be made more effective through the addition of a mixture of certain suitable alcohols to a suitable acid. It is also known that the use of foams in maintenance operations on oil and gas wells has a number of advantages, such as reduced stimulation fluid loss to the subterranean strata, improved ability of the stimulation fluid to lift and suspend fine solids from the wellbore and the subterranean strata adjacent the wellbore, reduced stimulation fluid volume requirements, reduced hydrostatic pressure at the bottom of the wellbore caused by the weight of the column of stimulation fluid in the wellbore and improved flowback of stimulation fluid, dissolved plugging materials and fine solids. Accordingly, there is a substantial and unfulfilled need to produce better foamed stimulation fluids comprising a suitable acid and a mixture of certain suitable alcohols so as to obtain the benefits associated with the use of a suitable acid and a mixture of suitable alcohols and the benefits associated with the use of foams in the maintenance of oil and gas wells.

SUMMARY OF THE INVENTION

The object of producing foamed stimulation fluids, comprising a suitable acid and a mixture of certain suitable alcohols, for injection into wellbores drilled into the earth for the production of hydrocarbons so as to obtain the benefits obtained by using a suitable acid/alcohol mixture and the benefits obtained by using foams in maintenance operations in these wellbores is obtained by the use of the liquid composition described herein. This liquid composition, which when contacted with a suitable gas, produces a foam having a half-life of at least 30 minutes and a foam quality of at least 60 percent, comprises about 60 to about 95 volume percent of a suitable water-soluble acid and about 40 to about 5 volume percent of a base fluid. The base fluid comprises about 10 to about 40 volume percent foaming agent effective for foaming the water-soluble acid and base fluid and about 90 to about 60 volume percent of a mixture of at least one eight-carbon aliphatic alcohol and at least one aliphatic alcohol with between one and five carbon atoms. The eight-carbon aliphatic alcohol comprises at least about 2 volume percent of the alcohol mixture and the at least one aliphatic alcohol with between one and five carbon atoms comprises at least about 22 volume percent of the alcohol mixture. It is surprising that this mixture can be foamed, since it contains substantial amounts of alcohols with less than five carbon atoms. This is contrary to the widely held belief as recited in lines 57–61, column 4 of U.S. Patent 4,217,231 that alcohols and organic acids having less than five carbon atoms act as foam breakers.

DETAILED DESCRIPTION OF THE INVENTION

The general object of the present invention, to produce foamed stimulation fluids for injection into wellbores drilled into the earth for the production of hydrocarbons, so as to obtain the benefits obtained by using a mixture of a suitable acid with a mixture of alcohols, and to obtain the benefits associated with the use of foams in maintenance operations in these wellbores, is obtained through the use of the liquid composition described herein.

This liquid composition, when contacted with a suitable gas, produces a foam having a half-life of at least 30 minutes and a foam quality of 60 percent, suitable for use in oil field applications. The term "foam quality" refers to the gas contained in the foam expressed as a volume percent. The term "foam half-life" refers to the time required for one-half of the liquid contained in the foam to separate from a static column of foam. Generally, many gases such as helium, carbon dioxide, nitrogen, air and the like can be used to produce the foam but nitrogen and air are inexpensive, generally effective and convenient. In most instances, liquid nitrogen is readily available, and the use of nitrogen avoids injecting oxygen and other contaminants found in air, into the subterranean strata.

The liquid composition of this invention comprises about 60 to about 95 volume percent of a suitable water-soluble acid and about 40 to about 5 volume percent of a base fluid. In the present invention, almost any water-soluble acid commonly employed for acidizing operations may be used. Generally, the water-soluble acid may include hydrochloric acid, acetic acid, formic acid, hydrofluoric acid, citric acid and mixtures of the above. More particularly, it has been determined that a solution of between 10 percent by weight and about 20 percent by weight hydrochloric acid in a hydrochloric acid and water solution forms a suitable water-soluble acid for use in the liquid composition of the present invention, with 15 percent by weight hydrochloric acid in a hydrochloric acid and water solution being the preferred water-soluble acid. It has also been found that it is preferred to have a liquid composition pH of less than about 3.5.

The base fluid of the present invention comprises about 10 to about 40 volume percent foaming agent effective for foaming the water-soluble acid and base fluid and about 90 to about 60 volume percent of a mixture of at least one eight-carbon aliphatic alcohol and at least one aliphatic alcohol with between one and five carbon atoms. The at least one eight-carbon aliphatic alcohol comprises at least about 2 volume percent of the alcohol mixture and the at least one aliphatic alcohol with between one and five carbon atoms comprises at least about 22 volume percent of the alcohol mixture.

More particularly, it has been determined that the most effective base fluid comprises between about 12 to about 38 volume percent foaming agent effective for foaming the water-soluble acid and base fluid and about 88 to about 62 volume percent of a mixture of at least one eight-carbon aliphatic alcohol and at least one aliphatic alcohol with between one and five carbon atoms. The preferred concentration of foaming agent in the base fluid is between about 14 to about 30 volume percent, with between about 86 to about 70 volume percent of a mixture of at least one eight-carbon aliphatic alcohol and at least one aliphatic alcohol with between one and five carbon atoms.

Foaming agents suitable for use in the liquid composition of the present invention comprise soluble mixed salts of alkyl ether sulfates and alkyl sulfonates having 4 to 12 carbon atoms. Such foaming agents are commercially available from Millmaster Corporation's Onyx Chemical Company, as the Ofax line of foaming agents.

The base fluid also comprises a mixture of at least one eight-carbon aliphatic alcohol and at least one aliphatic alcohol with between one and five carbon atoms. Preferably, a surfactant comprising generally a phenoxy polyoxy ethylene alcohol containing from 10 to 18 oxyethylene units or, more specifically, a 10 to 18 mole ethylene oxide adduct of nonylphenol is added to the alcohol mixture. One suitable mixture of alcohols of the type described herein are commercially available from Welchem, Inc., As the A-Sol line of solvents.

Broadly speaking, the liquid composition described herein is preferably manufactured by first premixing at least one eight-carbon aliphatic alcohol and at least one lower aliphatic alcohol with between one and five carbon atoms in order to avoid imbalance between the alcohols that could result in the formation of a two-phase system. The foaming agent is then added to the alcohol mixture with agitation to prepare a uniform base fluid. The base fluid is then added to a suitable water-soluble acid with agitation to prepare a uniform wellbore treating fluid.

The following specific examples illustrate the use of the herein described liquid composition which when contacted with a suitable gas will produce a foamed fluid with sufficient foam half-life and foam quality for use as a stimulation fluid. It is to be understood that the examples are for the purpose of illustration only and is not to be regarded as a limitation of the present invention.

EXAMPLE 1

This example illustrates the comprehensive nature of initial testing done with a number of commercially available alcohol mixtures, acids and commercially available foaming agents and combinations thereof to identify those alcohols, acids and foaming agents capable of producing foam with sufficient half-life (i.e., at least 30 minutes) and foam quality (i.e., at least 60 percent) for use as a stimulation fluid.

The unique composition of this invention was established from the use of a comprehensive test matrix which resulted in the evaluation of mixtures of a number of commercially available alcohol mixtures and various acids with commercial foaming agents, experimental foaming agents, commercial and experimental surfactants, coupling agents, thickeners, etc.

A number of commercially available alcohol mixtures comprising at least one eight-carbon aliphatic alcohol and at least one lower aliphatic alcohol with between one and five carbon atoms were tested as the mixed alcohol component of the base fluid, both alone and modified by the addition of surfactants comprising 12–15 mole ethylene oxide adducts of nonylphenol. Hydrochloric acid, acetic acid, citric acid and hydrochloric/hydrofluoric acid mixtures were tested as the water-soluble acid portion of the treatment fluid. One hundred and seventeen foaming agents, surfactants and additives were tested as the foaming agent component of the base fluid. Table 1 below lists and identifies foaming agent materials included in the test matrix. This list is meant to show the range of materials evaluated and is not to be construed as a comprehensive or complete list of the materials tests.

TABLE I

| Representative Foaming Agents and Additives Tested | |
|---|---|
| Material Name | Description and Supplier |
| Alfonic 1216-22 | A mixture of $C_{12}$ to $C_{16}$ alcohol reacted with 22 percent ethylene oxide, Conoco Chemicals. |
| Armomist 10 | Foaming agent, composition proprietary to Akzo Chemicals. |
| Amonyx CDO | Amine oxide, Millmaster Onyx Chemical Co. |
| Cosurfactant 120 | Alcohol/surfactant blend, composition proprietary to Welchem, Inc. |
| Drilcon 218 | Foaming agent, proprietary, The Richardson Company. |
| X-7602 | Experimental foaming agent, proprietary, The Richardson Company. |
| FC-740 | Fluorochemical surfactants, proprietary, 3M Company. |
| FC-741 | Fluorochemical surfactants, proprietary, 3M Company. |
| FC-742 | Fluorochemical surfactants, |

TABLE I-continued

Representative Foaming Agents and Additives Tested

| Material Name | Description and Supplier |
|---|---|
| LC-6880 | proprietary, 3M Company. Fluorochemical surfactants, proprietary, 3M Company. |
| NES-25 | Foaming agent, proprietary, Diamond Shamrock Company. |
| H-6300-1 | Experimental surfactant, composition proprietary to Welchem, Inc. |
| Neodol 25-3A | The ammonium salt of an ether sulfate prepared from a $C_{12}$-$C_{15}$ alcohol blend and containing 3 moles ethylene oxide, Shell Chemical Company. |
| Surfonic N-120 | Nonylphenol with 12 moles ethylene oxide, Texaco Chemical Co. |
| PDA | Surfactant (dispersant), proprietary, Borg-Warner, Inc. |
| OCE | Ethoxylated quaternary amine, Henkel Corp. |
| S-51938 | Experimental foaming agent, Stepan Chemical. |
| WA-215 | Amine sulfonate, Welchem, Inc. |
| 4902-30A | Experimental surfactant, Witco Chemical Corp. |
| Poly LHT-67 | Polypropylene polyol, BASF Wyandotte Corp. |
| Ethox RSI-114 | Surfactant, proprietary, Ethox Chemicals Inc. |
| Klucel H | Hydroxypropyl cellulose, Hercules, Inc. |
| Ofax I | Mixed sulfonate/sulfate salts, Millmaster Onyx Chemical Company. |
| Ofax V | Mixed sulfonate/sulfate salts, Millmaster Onyx Chemical Company. |
| Ofax VI | Mixed sulfonate/sulfate salts, Millmaster Onyx Chemical Company. |
| Ofax IX | Mixed sulfonate/sulfate salts, Millmaster Onyx Chemical Company. |

The test matrix was first used to identify foaming agents and combinations of foaming agents which were compatible with the alcohol mixtures tested. Those combinations found to be compatible were then combined with the acid portion and tested for foaming characteristics. A variety of techniques was used to generate foams, including shake testing in test tubes and graduated cylinders, dispersal of gas (nitrogen) into the liquid, high shear mixing in a Waring blender and whipping in a Hobart food blender. The foams generated were evaluated based on the quality of the foam, i.e., the gas fraction of the foam, produced and the foam half-life, i.e., the time required for one-half of the contained liquid to drain from a static column of from.

From the results of these tests, it was determined that many combinations of alcohol mixtures, acids and foaming agents failed to produce a foam at all. Many combinations of alcohol mixtures, acids and foaming agents produced a foam, but without sufficient foam quality and foam half-life for use as a foamed stimulation fluid. Those foaming agents which resulted in foams of sufficient quality and half-life to warrant further study included the fluorochemical surfactants available from the 3M Company and the Ofax foaming agents from Millmaster Corporation's Onyx Chemical Company. Used alone, the fluorochemical surfactants produced foams but without sufficient half-life for use as foamed stimulation fluids. Efforts to enhance these foams with other foaming agents such as those listed in Table 1 were unsuccessful. It was discovered that Millmaster Corporations's Onyx Chemical Company's Ofax line of foaming agents including Ofax I, Ofax V, Ofax VI and Ofax IX comprising mixtures of the salts of alkyl sulfonates and alkyl ether sulfates produced foams with uniformly better foam quality and foam half-life than the other foaming agents and additives tested. The selected tests described in Table 11 below are illustrative of the unique superiority of foams prepared with liquids containing an Ofax foaming agent.

TABLE II

| Alcohol Mixture Used | Acid Used | Foaming Agent | Foam Quality (%) | Half-Life Minimum (min) |
|---|---|---|---|---|
| Commercially available mixture of at least one eight carbon aliphatic alcohol and at least one lower aliphatic alcohol with a phenoxy polyoxy ethylene alcohol containing from 12-15 oxyethylene units | 15% HCl | 3M FC-742 | 67 | 10.5 |
| | 15% HCl | 3M FC-740 | 63 | 6.5 |
| | 15% HCl | Ofax V | 80 | 69.8 |
| | 15% HCl | Ofax VI | 71 | 58.3 |

The fluids containing Ofax foaming agent which produced foams having good foam quality and long half-life were observed to be more viscous than those which did not foam as well. This is in agreement with the common knowledge in foaming technology that higher fluid viscosity contributes to foam stability and longer foam half-life.

EXAMPLE 2

This example illustrates further testing done with selected commercially available alcohol mixtures, an acid typical of those used in acidizing operations and commercially available Ofax foaming agents.

Foam samples were conveniently prepared by manually agitating 10 milliliters of the foaming liquid composition in 50 milliliter glass stoppered, graduated cylinders, thereby mixing the liquid composition with the air contained in the graduated cylinder to produce a foam. Foam volume was conveniently determined by use of the graduations on the cylinder, and the foam half-life was determined from the time required for one-half of the fluid to drain from the foam. During these half-life determinations, the stopper was in place in the graduated cylinder to prevent evaporation of the volatile components of the foamed liquid composition. Larger scale samples were prepared by mixing in a Waring blender or by mixing in a Hobart food blender equipped with a wire whip. Samples prepared in the blenders were transferred to 2000 milliliter graduated cylinders for foam quality and foam half-life determinations.

From tests of various mixtures of alcohol blends, typical oilfield wellbore acidizing acids and Ofax foaming agents, it was determined that foams suitable for use in oilfield applications were produced when the liquid composition comprised about 60 to about 95 volume percent of water-soluble acid and about 40 to about 5 volume percent of base fluid, comprising about 10 to about 40 volume percent foaming agent and about 90 to about 60 volume percent of at least one eight-carbon aliphatic alcohol and at least one aliphatic alcohol with between one and five carbon atoms. Further testing indicated increased foam quality and foam half-life with between about 12 to about 38 volume percent foaming agent in the base fluid. Foams with the highest foam quality and foam half-life were produced with between about 14 to about 30 volume percent foaming agent in the base fluid. Increased foam quality and foam half-life was also observed with the addition of a surfactant comprising a 10 to 18 mole ethylene oxide adduct of nonylphenol.

EXAMPLE 3

This example illustrates further testing done with a liquid composition comprising a mixture of a commercially available alcohol blend comprising at least one eight-carbon aliphatic alcohol and at least one lower aliphatic alcohol with between one and five carbon atoms, 15% by weight HCl in a hydrochloric acid and water solution and Millmaster Corporation's Onyx Chemical Company's Ofax V foaming agent.

The liquid composition described in this example is understood not to limit the scope of the invention but rather is an example of a liquid composition falling within the preferred range of compositions. The liquid composition utilized consisted of a miscible acidizing composition (commercially available alcohol blend comprising at least one eight-carbon aliphatic alcohol and at least one lower aliphatic alcohol with between one and five carbon atoms and 15 percent by weight HCl) which has been established by commercial use to be an effective acidizing composition, into which foaming agent (Millmaster Corporation's Onyx Chemical Company's Ofax V) has been incorporated by mixing. The base fluid comprised 17 volumes of Ofax V and 83 volumes of the mixture of an eight carbon aliphatic alcohol with at least one aliphatic alcohol containing between one and four carbon atoms. The liquid foaming composition was then produced by blending 20 volumes of the base fluid with 80 volumes of 15 percent HCl.

Testing indicated that this liquid composition consistently produced a stable foam with a foam quality of 65 percent or better and a half-life of 60 minutes or better, whether foamed by manual agitation or by mechanical mixing. The useful foaming properties of this liquid composition having been established, the liquid composition was subjected to additional tests to establish its suitability for oil field use.

To determine if the inclusion of foaming agent, Ofax V, affected the acidizing properties of the mixture of alcohols and acid, bottle tests with Ofax V foaming agent excluded and present were performed and the results compared. These tests involved mixing the test fluids with a field sample of crude oil and its associated brine and observing the sample after a quiescent period. Favorable acidizing properties resulted in water wetting of the glass container, clean separation of oil and aqueous layers, no sludge formation and a fairly clear or moderately turbid aqueous layer. In the comparison tests, the Ofax V containing samples were as effective in achieving favorable acidizing properties as the samples without Ofax V.

Another test to determine if the inclusion of a foaming agent, Ofax V, affected the acidizing properties of the mixture of alcohols and acid was made by immersing test pellets, composed of pulverized calcium carbonate, crude oil and an asphalt binder, in the mixture of alcohols and acid to be tested, both with and without foaming agent. In this test, the calcium carbonate and hydrochloric acid react to produce carbon dioxide gas and soluble calcium chloride. The reaction of the acid with the calcium carbonate, which simulates a carbonate reservoir, resulted in the release of crude oil contained in the pellets as well as the asphalt binder. The crude oil in a sample without foaming agent rose and accumulated in a layer on top of the fluid. The carbon dioxide which formed escaped from the liquid. The asphalt binder accumulated on the bottom of the test vessel. The liquid composition of this invention exhibited two characteristics which make it superior to the alcohol/acid mixture alone. First the produced carbon dioxide produced foam which blanketed the pellet, thereby reducing the rate of attack by the hydrochloric acid on the calcium carbonate. This retardation of the acid/carbonate reaction rate is known to result in a more selective placement of acid in well treating since the acid can travel a greater distance in the reservoir rock before it becomes neutralized, or spent. The second characteristic noted was the suspension of asphalt binder in the foam and the lifting of the asphalt to the surface as additional foam was generated by the evolved carbon dioxide. In oil well acidizing, such removal of asphalt-like sludge and other particles would in all likelihood result in improved oil production.

Finally, to determine the temperature stability of the liquid composition of this invention, samples of the liquid composition were heated in an oven for two hours at different temperatures, then cooled to room temperature and foam quality and foam half-life were then determined. The foaming properties of samples stored for two hours at 125° F. and below remained unchanged.

The liquid composition of this example was also tested by including in the fluid typical amounts and kinds of additives commonly used in acidizing fluids, such as corrosion inhibitors, a nonemulsifier, a scale inhibitor, a clay stabilizer, a scale dissolver and a chelating agent. These additives were found to have no deleterious effects on the foaming properties of the liquid composition.

EXAMPLE 4

This example illustrates further testing done in an actual oil field application with the liquid composition of the present invention. In this procedure, 20 volume percent of base fluid falling within the concentration ranges claimed was mixed with 80 volume percent, 15 percent by weight HCl in a hydrochloric acid and water solution. The resulting liquid was then foamed with nitrogen and injected into several wellbores of fracturing pressures. The wellbores were allowed to back flow prior to injection of a commercially avaiable foamed acid treatment, comprising injection of 28 percent by weight HCl foamed with nitrogen. Comparison of the recovered fluid after each of these treatments indicated that use of the liquid composition of this invention resulted in a return of a demonstrably higher percentage of solids and oil.

While several specific compositions of the invention have been described, these are by way of illustration only, and not limitation, since other compositions will become apparent to those skilled in the art which are within the purview of the invention, in the scope of the appended claims.

What is claimed is:

1. An additive suitable for use with a water-soluble acid in treating subterranean strata adjacent a wellbore penetrating the subterranean strata comprising:
   from about 10 to about 40 volume percent of a foaming agent comprising mixed salts of alkyl ether sulfates and alkyl sulfonates effective for producing foamed solutions of the additive and the water-soluble acid having a half-life of at least 30 minutes and a foam quality of at least 60% for use in treating subterranean strata; and from about 90 to about 60 volume percent of an alcohol mixture which comprises at least 2 volume percent of at least one eight-carbon aliphatic alcohol and at least 22 volume percent of at least one aliphatic alcohol having less than five carbon atoms.

2. An additive as recited in claim 1, wherein said additive further comprises a surfactant comprising a phenoxy polyoxy ethylene alcohol containing from 10 to 18 oxyethylene units.

3. An oil and gas well treating fluid comprising:

about 60 to about 95 volume percent of a water-soluble acid for treating subterranean strata surrounding a wellbore penetrating the subterranean strata; and about 40 to about 5 volume percent of base fluid which comprises about 10 to about 40 volume percent of a foaming agent comprising mixed salts of alkyl ether sulfates and alkyl sulfonates effective for producing foamed solutions of the water-soluble acid and the base fluid, having a half-life cycle of at least 30 minutes and foam quality of at least 60%, and about 90 to about 60 volume percent of a alcohol mixture which comprises at least 2 volume percent of at least one eight-carbon aliphatic alcohol and at least 22 volume percent of at least one aliphatic alcohol having less than five carbon atoms.

4. An oil and gas well treating fluid as recited in claim 1, wherein said oil and gas well treating fluid further comprises a surfactant comprising a phenoxy polyoxy ethylene alcohol containing from 10 to 18 oxyethylene units.

5. An oil and gas well treating fluid comprising:

about 60 to about 95 volume percent of an aqueous fluid comprising about 15 percent by weight hydrochloric acid in a mixture of hydrochloric acid and water; and about 40 to about 5 volume percent of a base fluid which comprises between about 12 to about 38 volume percent foaming agent comprising a mixture of salts of alkyl ether sulfates and alkyl sulfonates and between about 88 to about 62 volume percent of an alcohol mixture which comprises at least 2 volume percent of at least one eight-carbon aliphatic alcohol and at least 22 volume percent of at least one aliphatic alcohol having less than five carbon atoms.

* * * * *